(12) United States Patent
Ryan et al.

(10) Patent No.: US 6,347,549 B1
(45) Date of Patent: Feb. 19, 2002

(54) ENHANCEMENT OF STORM LOCATION FROM A SINGLE MOVING PLATFORM

(75) Inventors: Paul A. Ryan, Dublin; Dean E. Ryan, Columbus, both of OH (US)

(73) Assignee: Ryan International Corporation, Columbia, OH (US)

( * ) Notice: Subject to any disclaimer, the term of this patent is extended or adjusted under 35 U.S.C. 154(b) by 0 days.

(21) Appl. No.: 09/274,999

(22) Filed: Mar. 24, 1999

Related U.S. Application Data

(60) Provisional application No. 60/092,237, filed on Jul. 9, 1998.

(51) Int. Cl.$^7$ ................................................ G01W 1/00
(52) U.S. Cl. .................................................... 73/170.24
(58) Field of Search ............................. 73/170.24, 324, 73/72, 73, 170

(56) References Cited

U.S. PATENT DOCUMENTS

| | | | |
|---|---|---|---|
| 4,023,408 A | 5/1977 | Ryan et al. ................ 73/170 R |
| 4,156,182 A | * 5/1979 | Brick et al. ..................... 324/72 |
| 4,198,599 A | 4/1980 | Krider et al. .................. 324/72 |
| 4,395,906 A | * 8/1983 | Ryan et al. ..................... 73/170 |
| 4,422,037 A | * 12/1983 | Coleman ........................ 324/72 |
| 4,506,211 A | * 3/1985 | Coleman ........................ 324/72 |
| 4,806,851 A | 2/1989 | Krider et al. .................. 324/72 |
| 4,873,483 A | 10/1989 | Ostrander ....................... 324/72 |
| 5,295,072 A | 3/1994 | Stevens, Jr. et al. ......... 364/420 |
| 5,305,210 A | 4/1994 | Kuzma et al. ............... 364/420 |
| 5,331,330 A | 7/1994 | Susnjara ...................... 342/460 |
| 5,500,602 A | 3/1996 | Youngquist ................... 324/72 |
| 5,502,371 A | 3/1996 | Youngquist ................... 324/72 |
| 5,528,494 A | 6/1996 | Moses .......................... 364/420 |
| 5,610,813 A | 3/1997 | Greenewald et al. ....... 364/420 |
| 5,699,245 A | 12/1997 | Herold ........................ 364/420 |

* cited by examiner

*Primary Examiner*—Benjamin R. Fuller
*Assistant Examiner*—Jewel Thompson
(74) *Attorney, Agent, or Firm*—Connolly Bove Lodge & Hutz, LLP

(57) ABSTRACT

The location of weather activity from a moving platform such as an aircraft is enhanced using triangulation in time. More particularly, a first measurement of the weather activity is made relative to the aircraft at a first time. A second measurement of the location of the weather activity is made from the aircraft at a second period in time. The first measurement is modified or updated to correct for the change in position of the aircraft between the first and second measurements and then the modified data is compared with the data of the second measurement to enhance the location of the weather activity.

28 Claims, 14 Drawing Sheets

| L=1    V=250 | L=2    V=237 |
|         H=90 |         H=122 |
| $T_0$ = 12:33.45 | $T_0$ = 12:37.42 |
| $T_1$ = 12:37.42 | $T_1$ = |

"FLASH" Representation of Lightning Data

Raw strike data for a single flash.

WEIGHT=4

Strike data combined into a single flash with a weight of 4.

DISTRIBUTED WEIGHT=4

Priority distribution and endpoints shifted to the 50% and 30% points.

ENHANCEMENT OF STORM LOCATION FROM A SINGLE MOVING PLATFORM

RELATED APPLICATION

This application claims the benefit of the filing date of co-pending Provisional Application Ser. No. 60/092,237 filed Jul. 9, 1998.

TECHNICAL FIELD

The invention relates to storm mapping systems.

BACKGROUND OF INVENTION

Over the past 25 years, the aviation industry has been the beneficiary of improved storm mapping systems. See U.S. Pat. Nos. 4,023,408 and 4,395,906. Those storm mapping systems took advantage of the correlation between thunderstorms and lightning discharges. The violent air currents that are hazardous to aircraft flight produce the lightning discharge. The lightning discharge also generates electromagnetic radio waves. Directional receiving apparatus, located on board an aircraft, can determine the direction of the lightning discharge. Some information is available about the distance of the discharge as well. By receiving and storing this direction and distance information, a map is formed from the stored data, to give the pilot a plan view image of the storm activity relative to the aircraft.

From the inception of the popularity of these devices, it was known that there was a significant difference in the precision with which distance and direction was determined. In particular, direction was precise but distance was not. Various attempts have been made to eliminate the imperfect distance estimate. The present invention is premised on the conclusion that all of the prior efforts have fallen short of what is necessary.

SUMMARY OF INVENTION

Accordingly, the invention provides an enhanced weather mapping system for determining location of lightning related weather activity relative to a moving platform, such as an aircraft. The invention employs a receiver on board the platform which is responsive to electrical signals generated by the lightning in a predetermined frequency band. Associated with the receiver are means for determining the azimuth of a source of the electrical signals relative to the receiver. The data, indicating the azimuth from the receiver to the signal source is stored. After the platform has moved, the stored azimuth information is updated so as to correct for the motion of the receiver. Finally, a determination of weather pattern location is obtained by combining updated azimuth indications with more current azimuth information for estimating the location of a weather pattern at the intersection of a more current azimuth indication and an updated azimuth indication. Because the motion of the platform (i.e. the aircraft) is typically at a much higher rate than the motion of the weather activity, there is minimal error introduced by ignoring any weather motion.

More particularly, the invention can readily be explained as a unique application of well known triangulation. It is well known, indeed there are storm mapping systems which are based on, triangulation. As applied to weather mapping or storm mapping, triangulation is typically employed by determining the azimuth from a first location to weather activity and then determining the azimuth from a second location to the weather activity. Only one more piece of information is necessary to uniquely determine the location of the weather activity and that is the distance and direction which separate the two locations. The foregoing description has described triangulation in distance, i.e. where there is some distance between the two sensing locations.

The present invention is an application of triangulation in time, i.e. where there is but a single sensing location which is a moving platform, and that platform senses direction between the platform and the weather pattern at two different points in time.

The art is well aware of the equipment necessary to determine azimuth from a receiver to a source of electrical signals related to a lightning strike. The invention relies on use of any suitable apparatus to perform this function. It is also well known that triangulation requires two different measurements to be made. In accordance with the present invention, those two different measurements are measurements of azimuth between the moving receiver and the weather pattern. Before those two different measurements can be compared in a triangulation operation, one of the measurements must be adjusted to account for the change in position of the receiver due to the lapse in time between the two different measurements. More particularly, the first measured azimuth is updated to account for the motion of the receiver between the time of the first measurement and the time of the second measurement.

The motion of the platform can be measured or estimated in any of a number of ways with fairly good precision. This information is used to update the azimuth of the first measurement in a manner which will be described. Having been updated, it is then only necessary to combine the azimuth of the second measurement with the updated azimuth of the first measurement to locate the weather pattern in a manner that will be described. Accordingly, in one respect the invention comprises:

a system for estimating the location of a lightning related weather pattern relative to a moving platform, comprising:

a receiver, supported on the platform, responsive to electrical signals generated by the lightning in a predetermined frequency band;

first means responsive to the output of the receiver for determining the azimuth of a source of the electrical signals relative to the platform;

memory means coupled to the first means for storing an indication of the azimuth;

second means for updating the stored indications to correct for motion of the platform so as to provide an updated azimuth indication; and third means for combining stored and updated azimuth indications for estimating the location of the weather pattern at the intersection of an azimuth indication and an updated azimuth indication.

In another respect, the invention comprises:

a method of enhancing an estimate of the location of a lightning related weather pattern relative to a moving platform, comprising:

receiving, on the platform, electrical signals generated by the lightning at a predetermined frequency band;

repeatedly determining from the received signals, the azimuth of a source of the electrical signals relative to the platform;

storing at least one indication of the azimuth from at least one said determination;

updating one or more stored indications to correct for the motion of the platform to provide at least one updated indication; and combining at least one stored and at least one updated indication for estimating the location of the weather pattern as the intersection of a memory indication and an updated memory indication.

BRIEF DESCRIPTION OF THE DRAWINGS

The present invention will be described in further detail in the following portions of this specification when taken in conjunction with the attached drawings in which.

BEST AND VARIOUS MODES FOR CARRYING OUT INVENTION

Figure 1:
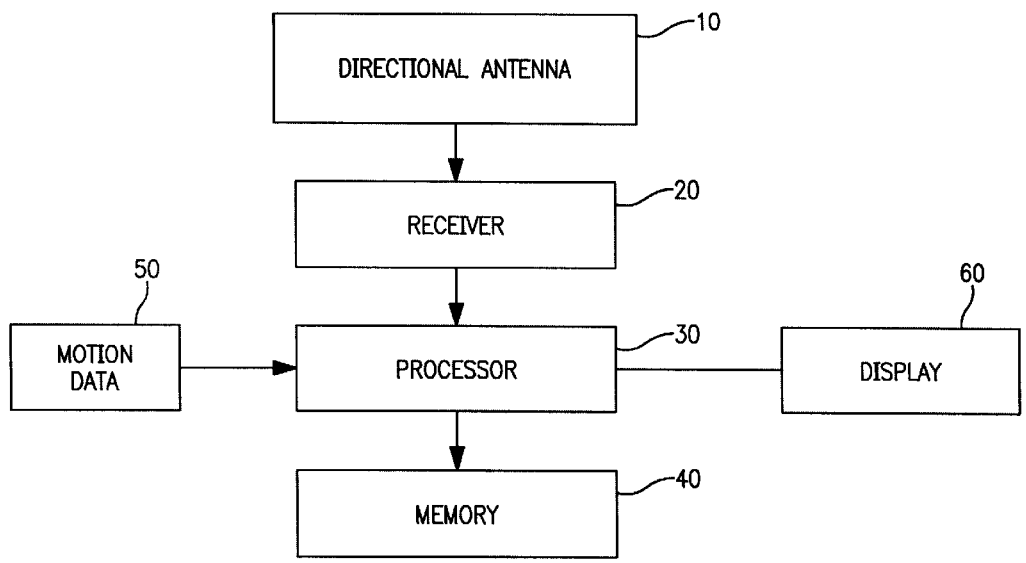
FIG. 1 is a block diagram of one embodiment of the invention.

FIG. 1 is a block diagram illustrating several components of an embodiment of the invention. In particular, a directional antenna 10 provides signals to a receiver 20. The directional antenna 10 and receiver 20 may be tuned to an appropriate frequency band as is described for example in Ryan U.S. Pat. No. 4,023,408 (the disclosure of which is incorporated herein by reference), so as to focus on signals generated by lightning. Those skilled in the art will understand that although the drawing shows only a single connection between the directional antenna 10 and the receiver 20, in practice, there are several signals provided by the antenna to the receiver so that the receiver can perform its function. In any event, the receiver is tuned and provides a plurality of signals to the processor 30. The processor 30 is capable of generating an azimuth indication from the signals provided by the receiver 20, all as described in U.S. Pat. No. 4,023,408. The memory 40 is coupled to the processor 30 so that the processor can store in the memory an indication of the azimuth information that has been calculated. The processor, in addition to storing the azimuth indication, also stores a time stamp indicating the time at which the azimuth measurement was made and stored.

The processor 30 is also coupled so as to drive a display 60. The display 60 can take a wide variety of forms although preferably it is a cathode ray tube or equivalent such as is described in U.S. Pat. No. 4,023,408. However, different from the processing described in U.S. Pat. No. 4,023,408, at this point the memory 40 only stores one or more azimuth indications and associated time stamps. In other words, the processor 30 need not estimate the location of weather activity using the information thus far described.

FIG. 1 shows an additional input to the processor 30, referenced as motion data 50. In the simplest form, the motion data 50 can merely comprise information respecting the aircraft's heading and velocity. Sensors to produce real time motion data are well known. The processor 30 may periodically respond to the motion data by storing the motion data or motion data can be stored only when it changes, as will be described. As a consequence, the memory 40 stores two types of information, the azimuth indication and associated time stamps related to weather activity as well as an indication of the aircraft's heading and velocity and the times during which those parameters were maintained. As the aircraft changes either velocity and/or heading, the processor 30 is programmed to respond to the changes in two ways, (1) to update the present velocity and heading and (2) to complete the duration of the previous leg.

Figures 2A, 2B:
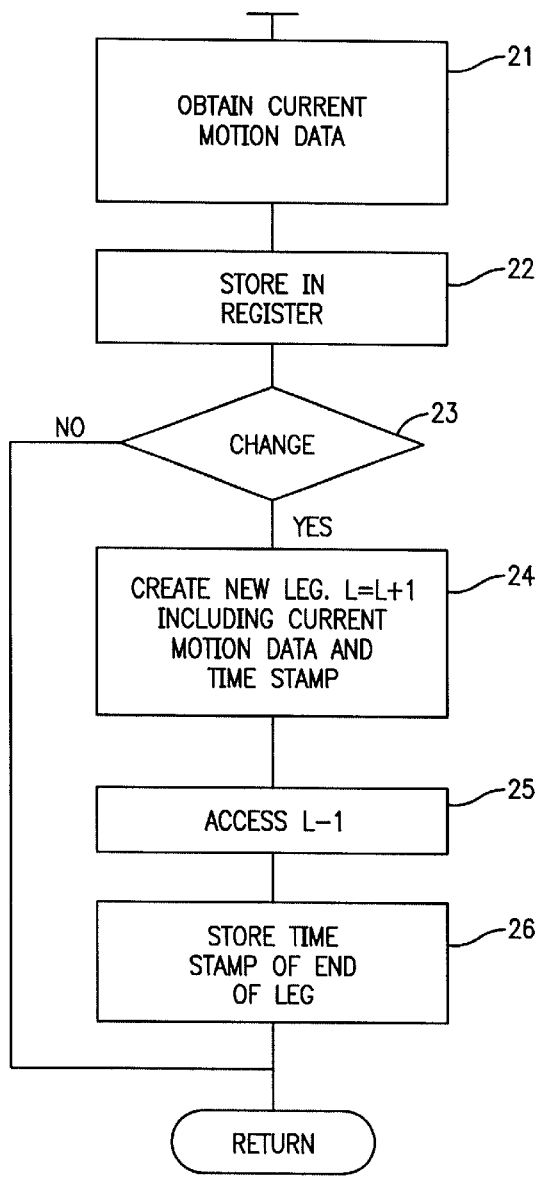
FIG. 2A is a flowchart showing the process that may be used to record changing values of motion parameters.
FIG. 2B shows exemplary motion parameter records that may be used.

More particularly, FIG. 2A shows a flowchart of the processors activity relative to the motion data 50. The flow chart may be entered periodically, e.g. every minute. The first step, step 21, obtains the current motion data; the two parameters are velocity V and heading H. Step 22 stores the data in a register. Step 23 determines whether there has been any change. The manner in which this is effected will become clear below. Assume for the time being that a change is detected. Then step 24 is entered which creates a new leg, L=L+1, which includes the current motion data and a time stamp. FIG. 2B illustrates a partially completed leg, L=2, and a completed leg, L=1. Step 24 just described is sufficient to fill in the parameters V, H and $T_0$ in L=2. Thereafter, step 25 accesses the previous leg, L−1. Step 26 then stores the time stamp of the end of the leg, L−1, i.e. it provides the parameter $T=T_1$.

Function 23 determines if there has been a change in a motion parameter by comparing the V and H parameters from the register (associated with step 22) with the parameters in the current leg.

In this fashion, the memory maintains a complete sequence of motion data. As will be described hereinafter, the data need only be maintained for a limited amount of time, such that a different set of functions will compare current time to the time at which a leg was completed ($T_1$), and where the difference exceeds a threshold, that block will be deleted as simply unnecessary.

In order to obtain an enhanced estimate of the location of weather activity, at least two different measurements are required, each measurement producing a different azimuth indication. Refer for example to FIGS. 3A–3D which graphically shows how weather activity can be located based on triangulation in time.

Figure 3A:
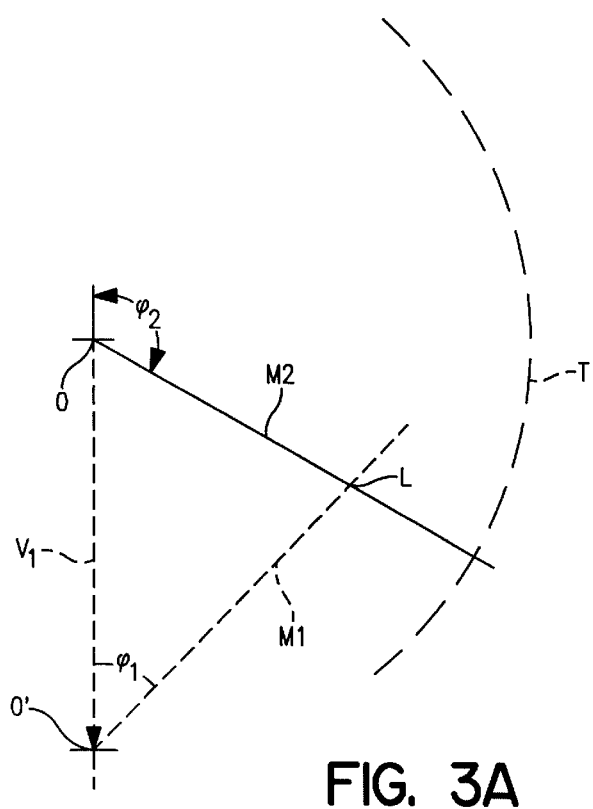
FIGS. 3A–3D show, in graphical form the processing used to locate a storm or weather activity from two, time separated, azimuth measurements.

FIG. 3A shows that an azimuth measurement M2 (of azimuth $\phi_2$) is combined with an updated, and earlier azimuth measurement M1. In order to do this, the original measurement (of azimuth $\phi_1$) is updated by offsetting the origin to the point 0'. This offset is accomplished by the vector V1 obtained from the motion data applicable to the time between the measurement M1 and M2. Although neither measurement M1 nor the measurement M2 can identify the distance from the aircraft to the weather activity, the combination of the measurement M2 with the updated measurement M1 does allow the location of the weather activity to be identified, relative to the platform, at the point L.

Figure 3B:
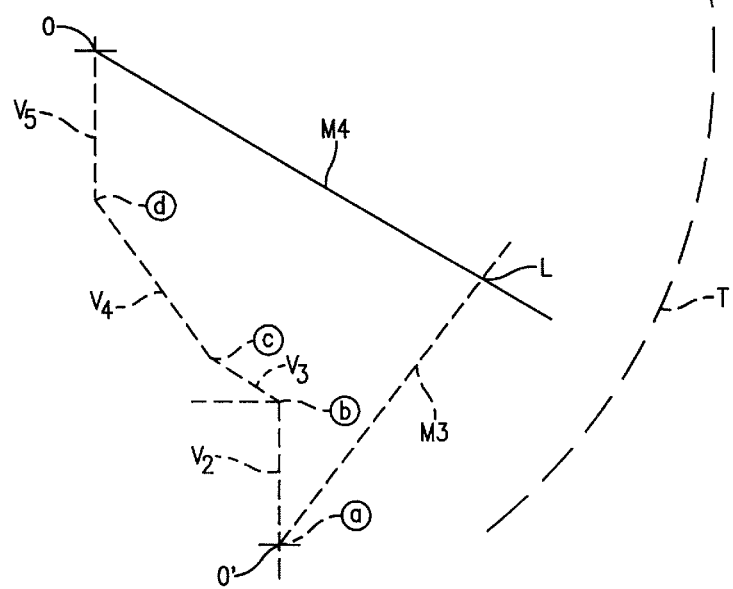

It will be appreciated that there is no reason that the updating be limited to a single leg. FIG. 3B is an illustration of the combination of an azimuth measurement M4 with an earlier azimuth measurement M3 which are separated by four different legs, each represented by a different one of vectors V2–V5.

Figure 3C:
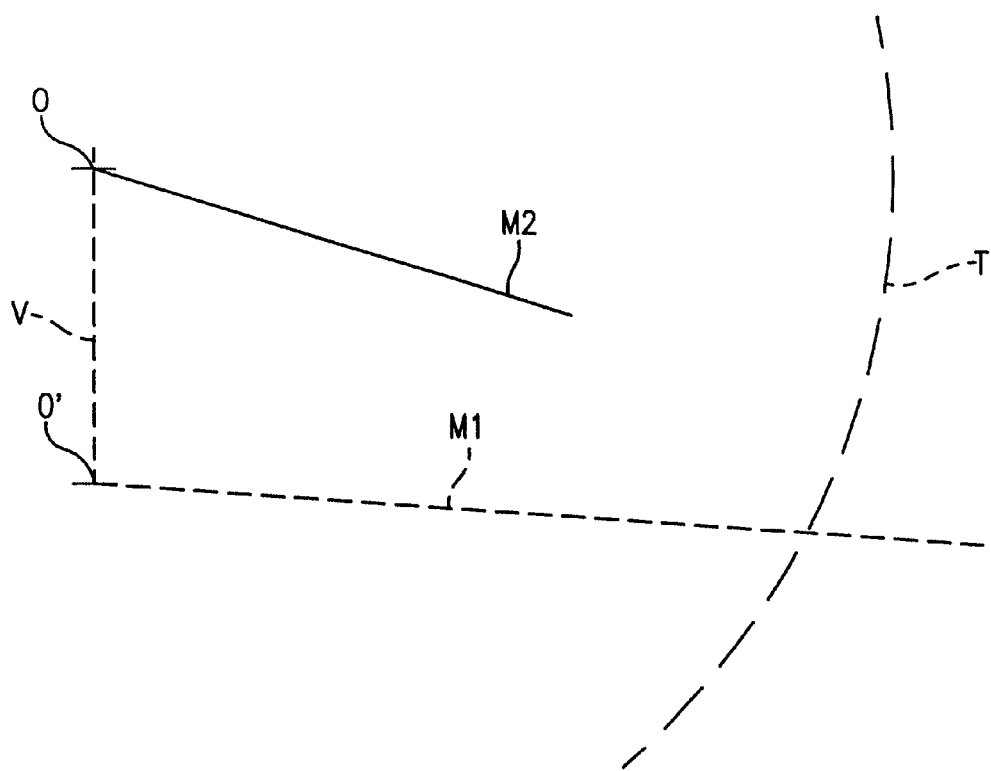

FIG. 3C illustrates the situation where two measurements, M1 and M2, are inadequate to uniquely locate the weather activity within the region (defined by the circle T) of interest.

Figure 3D:
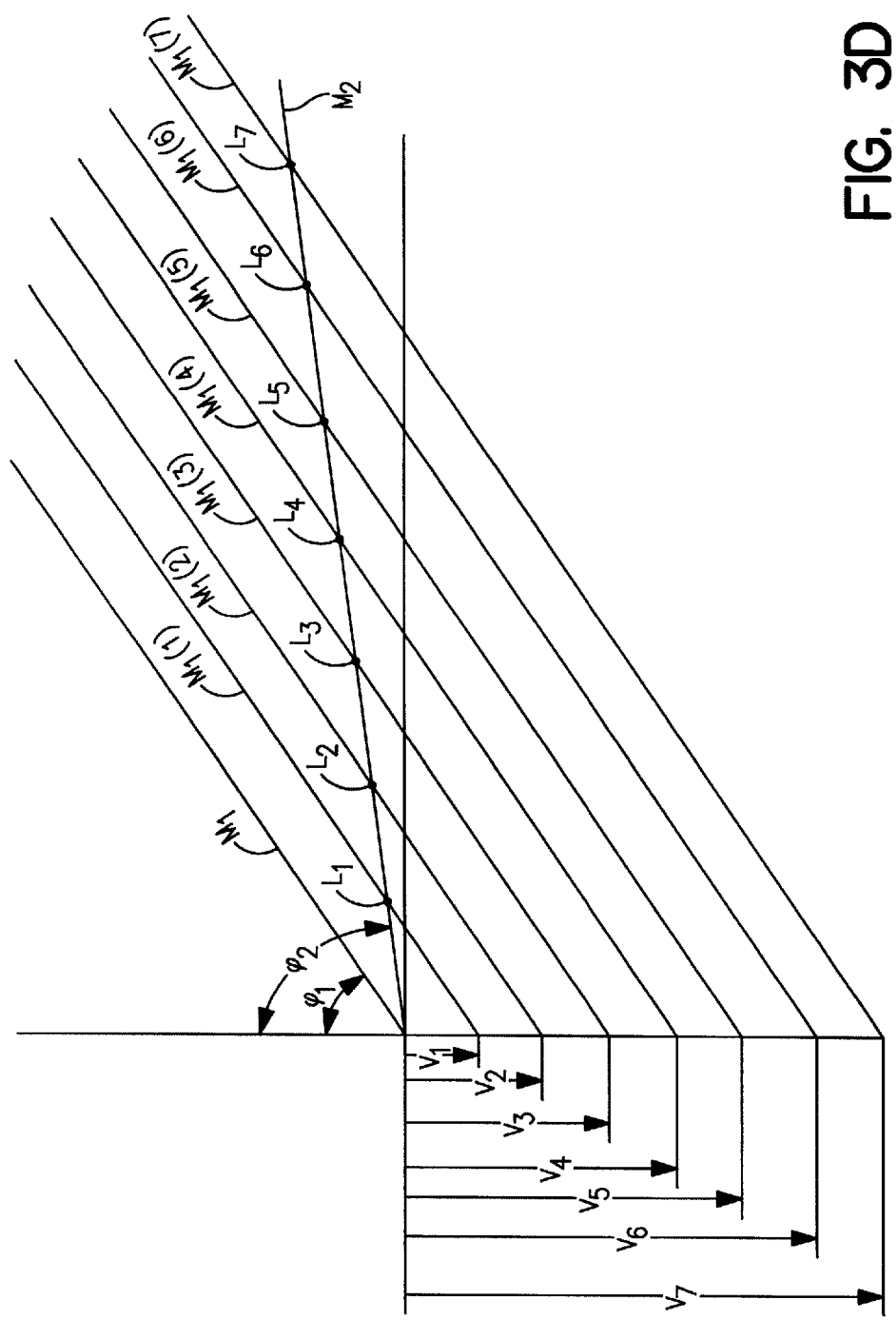

FIG. 3D shows how the location L of the weather activity varies relative to the platform for different corrections. More particularly, FIG. 3D shows the second measurement M2 and a first measurement M1. Depending on the velocity of the aircraft and the time between measurements, FIG. 3D shows different corrections for updating, applying vectors V1–V7. Each different weather activity location, $L_1$–$L_7$ is associated with a different updating vector $V_1$–$V_7$.

It will be apparent to those skilled in the art that the processing, as described so far does not account for the potential motion of the weather activity. However, the relative velocity of the weather activity and the platform indicates that for the most part the error introduced by failing to account for the motion of the weather activity is not significant.

Preferably, stored azimuth indications are updated to correct for motion of the platform about once every 10 seconds.

The foregoing embodiment is based on the use of aircraft carried equipment to measure and/or estimate the parameters of velocity, heading and time. There is, however, available alternatives.

Figure 4:
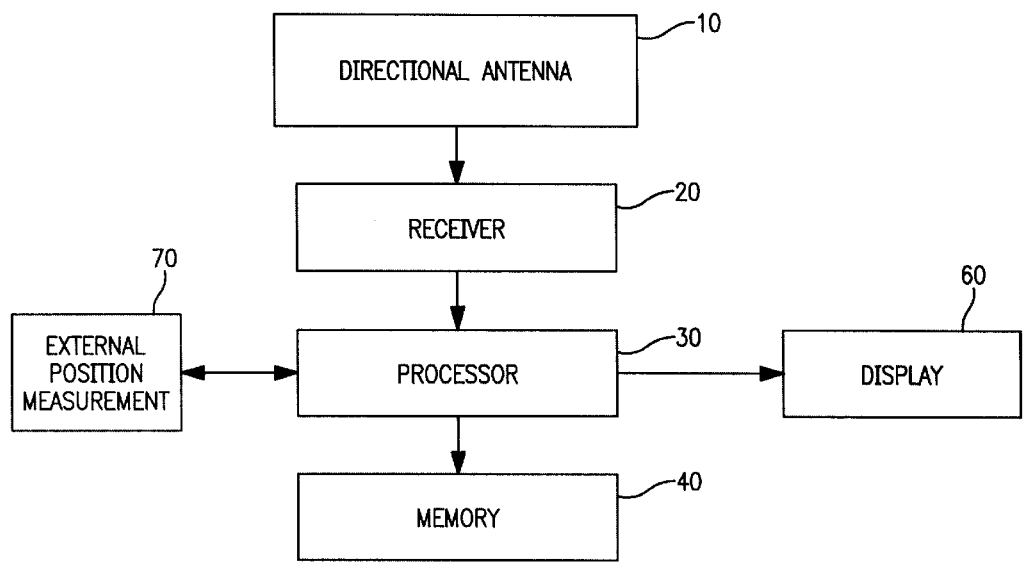
FIG. 4 is a block diagram of an embodiment of the invention relying on external position location resources.

Either the well known LORAN or Global Positioning System (GPS) is available for locating the aircraft at different times. Using either of these systems, the position of the aircraft at the time of each of the different measurements can be obtained and the updated azimuth indication can be based on the aircraft's change in position as measured by either LORAN or GPS. FIG. 4 is a block diagram of an embodiment relying on an external position measurement system such as either LORAN or GPS. The system of FIG. 4 differs from the system of FIG. 1 in that the processor 30 (of FIG. 4) can call for the position measurement at any time. At the time the processor requests a position measurement, the external position measurement system 70 returns to the processor a measurement of the aircraft's position in a suitable coordinate system such as latitude and longitude. In all other respects, the embodiment of FIG. 4 may be identical to the embodiment of FIGS. 1–3. In other words, periodically each prior azimuth measurement is updated to account for any changes in position and heading for the aircraft.

In a further embodiment, the processor can record the position of the platform at the time of the measurement either in addition to the time of the measurement or in lieu of the time of the measurement. At a later, and arbitrary, time the processor can update any prior azimuth measurement by relying on the previously measured azimuth, the corresponding position, and the present position. The ability to update an azimuth measurement at any time allows the system flexibility in locating weather activity by combining time displaced measurements of the azimuth of the weather activity.

The embodiments described thus far do not even estimate weather activity range without the benefit of two different azimuth measurements. However, commercial equipment has used single azimuth measurements to estimate weather activity range for many years. In the embodiment to be described now, advantage is taken of the single measurement range estimate.

Figure 5:
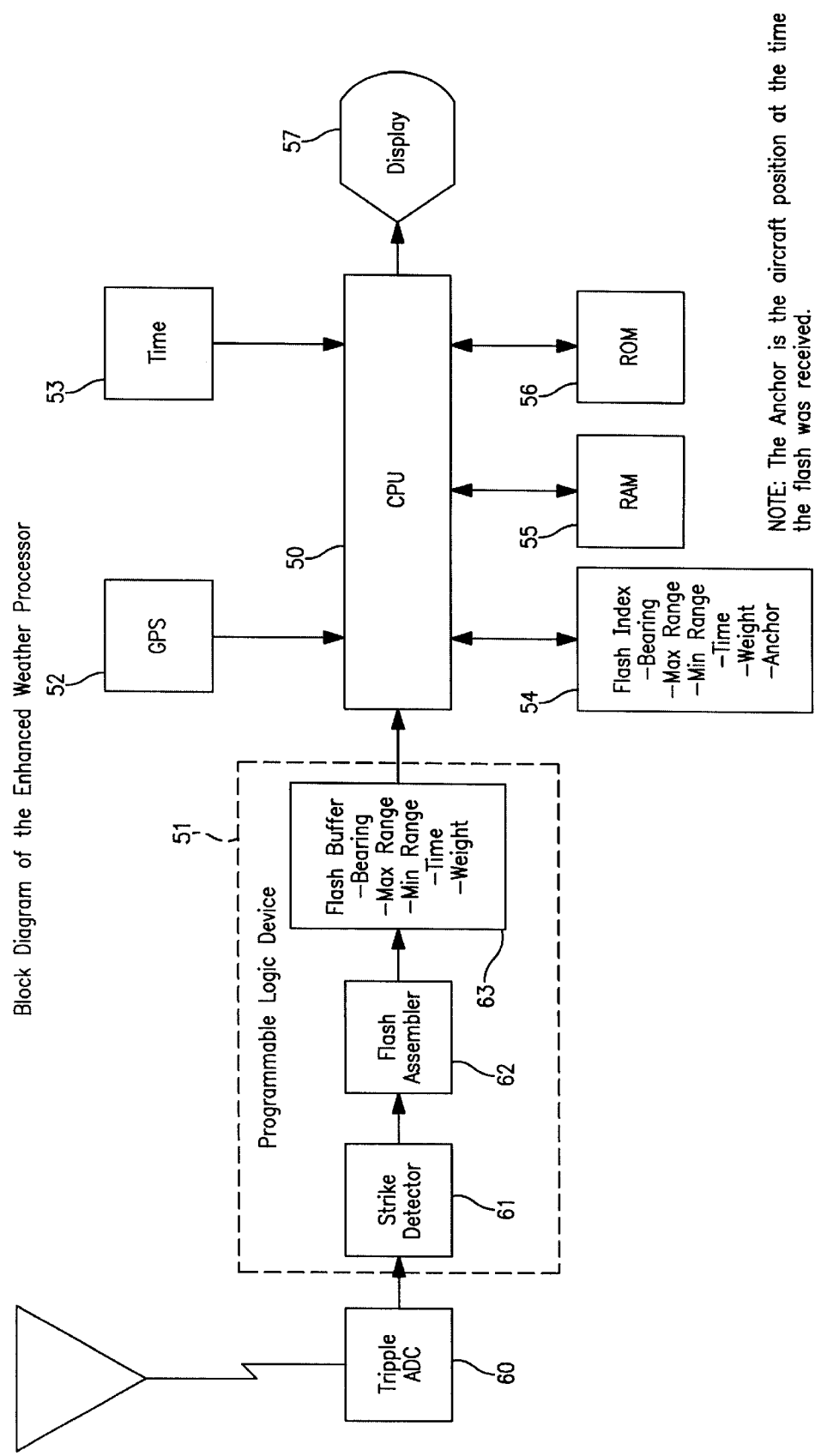
FIG. 5 is a block diagram of another embodiment in which strike information is used to build up a flash history and the flash information is used to locate the weather activity.

FIG. 5 is a block diagram of still another embodiment of the invention in which weather activity range is estimated from single strikes, but then multiple strike information is employed and/or correlated to enhance range estimation. FIG. 5 shows that the antenna 70 is connected to the triple ADC 60, i.e. a three channel ADC. The three channels are analogous to those described in U.S. Pat. No. 4,023,408, i.e. an omnidirectional sense channel and two orthogonal channels. The output in digital form is fed to a programmable logic device 51. This device includes strike detector 61, flash assembler 62 and a flash buffer 63.

The components of the system of FIG. 5 operate in two distinctly different time regimes. The programmable logic devices, including strike detector 61, flash assembler 62 and flash buffer 63, assemble discrete flashes from individual strikes. For purposes of defining a flash, we consider a flash to include one or more strikes which are at the same or nearly the same azimuth and occur sequentially in time with no gaps more than a predetermined short time such as 50 milliseconds. Because there may be simultaneous or near simultaneous flashes at widely different azimuths, the flash assembler uses a flash buffer 63 to retain data on partially completed flashes. Once a flash is completed, i.e. 50 milliseconds has elapsed without another strike at the same or nearly the same azimuth, the data on the flash is handed off to the CPU 50 where it may be stored in the flash index 54. The flash index will retain flashes for a relatively long period of time, e.g. 10 minutes. Thus the time scale for the flash assembler 62, and flash buffer 63 is on the scale of tenths of seconds, whereas the time scale for the flash index is on a time scale of minutes.

The output of the flash buffer 63 provides five parameters for each flash. These are bearing, maximum range, minimum range, time and weight. The output of the flash buffer 63, including these parameters, is one input to CPU 50. Other inputs to CPU 50 are from a GPS receiver 52 and a time input such as from clock 53. The CPU 50 uses this information to create the flash index which is stored in memory element 54. Note that each entry in the flash index 54 includes an "anchor" which is not part of the data from the flash buffer 63. The anchor portion of the flash index identifies the position, in some suitable coordinate system, of the aircraft at the time the flash index entry is created. Since the processor 50 has access to the GPS receiver 52, the aircraft position or anchor for the flash index entry is merely the output of the GPS receiver 52 at the time the flash index entry is created. Those skilled in the art will understand that an alternative to use of GPS data is the use of LORAN data and that while both use latitude and longitude as a coordinate system, the invention is applicable using any suitable coordinate system. At the time that the processor 50 writes the flash index, using data from the flash buffer 63, the processor adds the anchor. With this information the CPU then writes to display 57 as will be described below.

The strike detector 61 responds to its digital input and in response to each strike, provides three pieces of data to the flash assembler 62, a range estimate, azimuth determination and time. The strike detector 61 performs those functions in any suitable manner, see for example U.S. Pat. No. 4,023,408 for a description of obtaining the range estimate and azimuth data.

Figure 7:
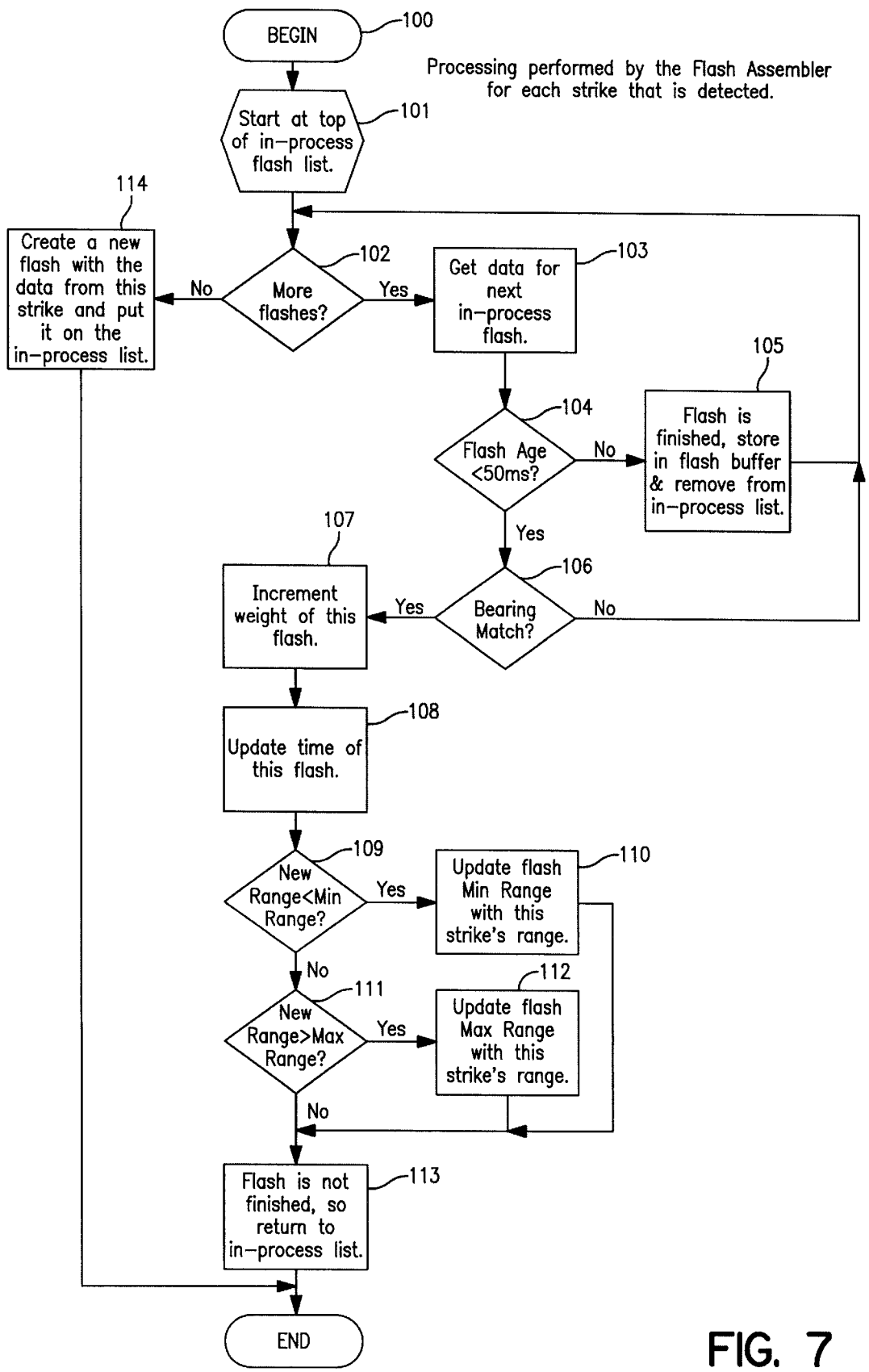
FIG. 7 is a flow diagram showing the functions of the flash assembler of FIG. 5.

FIG. 7 shows the functions performed by the flash assembler 62 with this data on each strike. The time of each strike should be accurate enough to uniquely identify each strike. Accuracy of 1 millisecond (a 1 KHz clock) is enough to distinguish between return strokes of a flash to adequately resolve flashes occurring at a rate of up to 500 per second. Preferably this process is initiated by the detection of a strike.

Referring to FIG. 7, when the process has begun function 101 starts at the top of an in-process flash list, i.e. a list of flashes which are still open for further data. At this point, assuming that only a single strike has been detected, the in-process flash list is empty so that step 102 is performed to determine if there are any more flashes on the list. In this case there are not, so step 114 is performed to create a new flash with the data from the strike and put it on the in-process list. That ends this pass through the flowchart of FIG. 7.

We will now pick up and continue the description with the assumption that there are several flashes on the in-process list. One suitable definition of a flash is a concatenation of strokes that have near identical bearing angles and which occur in a chain of strokes with gaps no larger than 50 milliseconds between strokes. Applying this definition, a flash is finished once a gap is identified which is greater than 50 milliseconds. To continue with the assumption, we will assume that we have in process flashes a, b and c on the list because each of the in-process flashes have not occurred at near identical bearing angles. Referring again to FIG. 7 and step 101, given an input stroke, the flowchart points to the first flash at the top of the list. Step 102 directs the flow to step 103 to get the data for this flash. Step 104 compares the time of the stroke with the flash age (the delay between the time of the last stroke added to the flash and the time of the stroke being processed). If the age is not less than 50 milliseconds, then step 105 is performed. This removes the flash from the in-process list and places it in the flash buffer 63. As will be described, the data in the flash buffer 63 is available to the CPU 50 for processing which will be described later. After step 105 is performed, step 102 is performed to see if there are any more flashes on the in-process list.

On the other hand, if the flash age was not greater than 50 milliseconds, then step 106 is performed to see if the bearing of the stroke and the bearing of the flash compare to be nearly identical. Assuming they do not, then processing steps back to step 102 to pick up another in-process flash. In effect, steps 103–106 process each stroke against each flash to determine if the flash is finished (is the gap more than 50 milliseconds?) and if it is not, whether this stroke is a bearing match with the flash. When the flash and stroke match in bearing, step 107 is performed to increment the weight of the flash. The initial weight of a flash is unity (because the flash is defined has having at least one strike), and the weight is incremented 1 per stroke added to the flash so that the weight in effect defines the number of strokes which make up the flash Step 108 then updates the time of the flash to make it coincide with the time of the stroke that has just been added to it. Each flash has a minimum and maximum range which identifies the range to the closest and furthest strikes which are part of the flash. When the flash is initiated these ranges are set equal to the range of the initial strike. As a consequence, when a strike is identified with a range which is less than the minimum range, then the minimum range of the flash is updated, see steps 109, 110. On the other hand, if the range of the stroke is greater than the flash's maximum range, then the maximum range of the flash is updated, see steps 111, 112. Step 113 then returns the flash to the in-process list and that terminates the processing of this strike. Each of the strikes is processed so as to build up the data in the in-process flash lists and once flashes are completed, the data for flashes which have been completed is transferred to the flash buffer 63.

Our study of lightning strikes reveals that the correct location for the flash is somewhere between the range determined for the closest strike and approximately 30% beyond the determined range for the farthest strike. We have also determined that the probability that the flash was as close as the closest strike is very low and we have chosen to assume that the strike lies between the midpoint from the closest strike to the farthest strike, i.e. the 50% point, and 30% beyond the furthest strike. We have also determined that the probability of the strike occurring between these points is distributed linearly such that the maximum probability is at the farthest strike and that probability goes to 0 at the 50% point and at 30% beyond the furthest strike.

Under other circumstances, other approximations for optimally locating the flash relative to strike range determination may be used. Indeed, another option is to merely locate the flash at the locations determined for the strike, or the average determined range for the strikes in the flash.

Figure 6A:
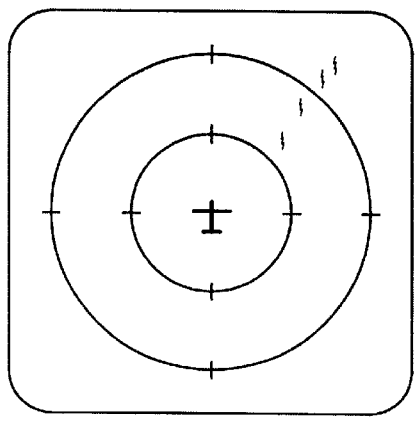
FIGS. 6A–G are different views of the display of FIG. 5 useful in the description.
Figure 6B:
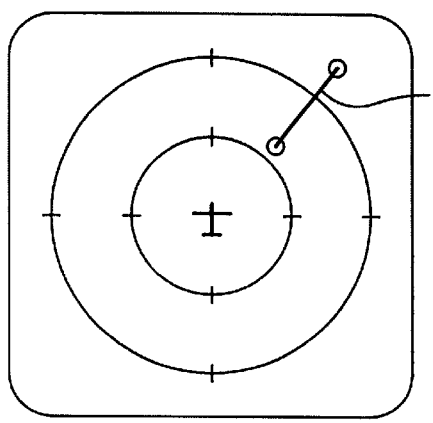
Figure 6C:
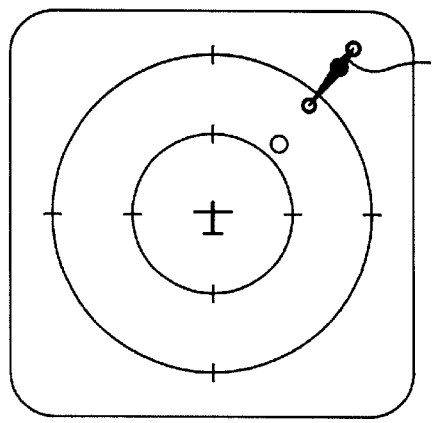

The foregoing is demonstrated in FIGS. 6A–6C. FIG. 6A shows typical strike data for a typical single flash. FIG. 6B shows the strike data combined into a single flash with a weight of 4 (corresponding to the number of strikes) and FIG. 6C shows the flash distributed from its original data points to the 50–30% points as just described.

Figure 6D:
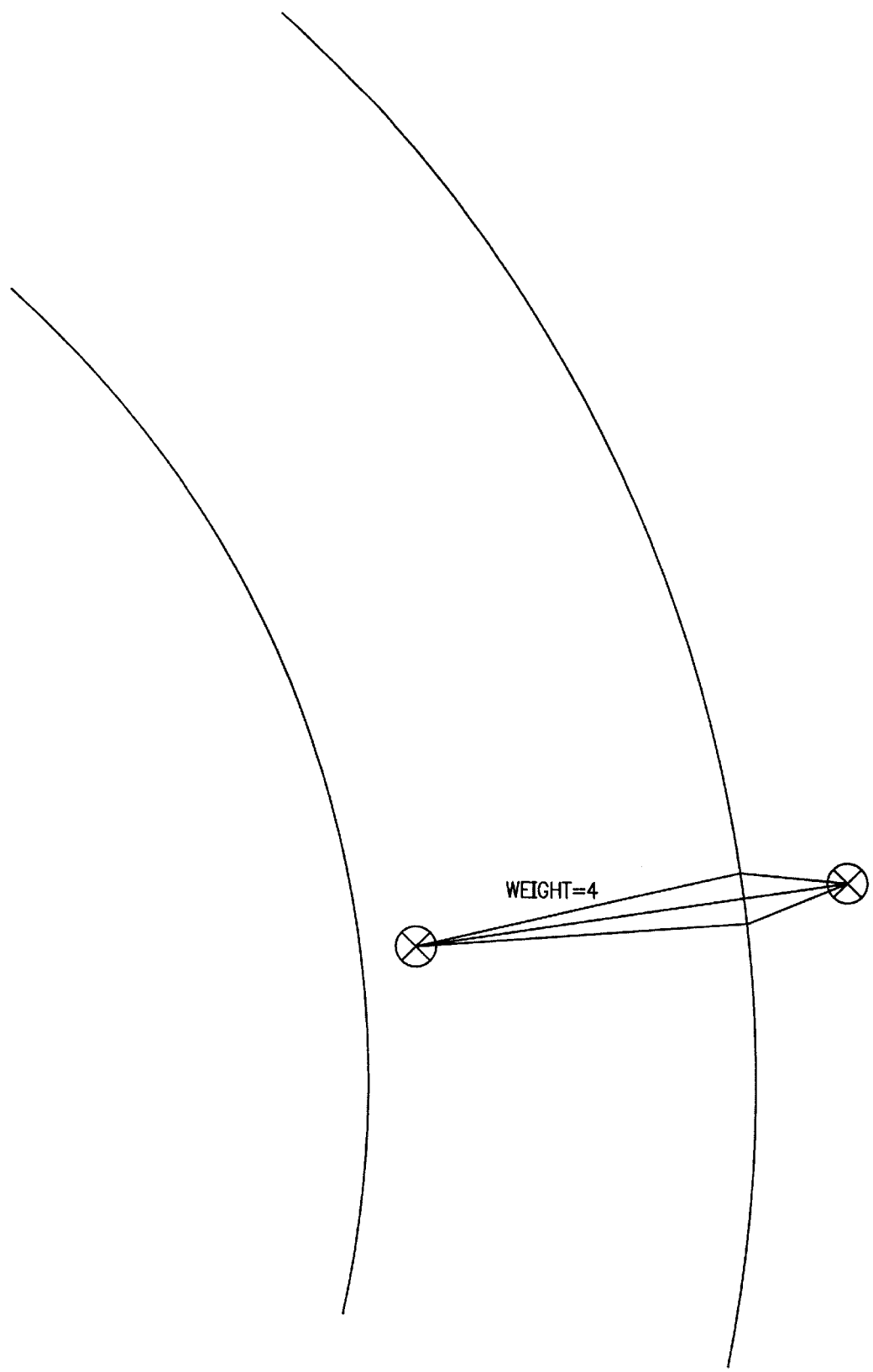
Figure 6E:
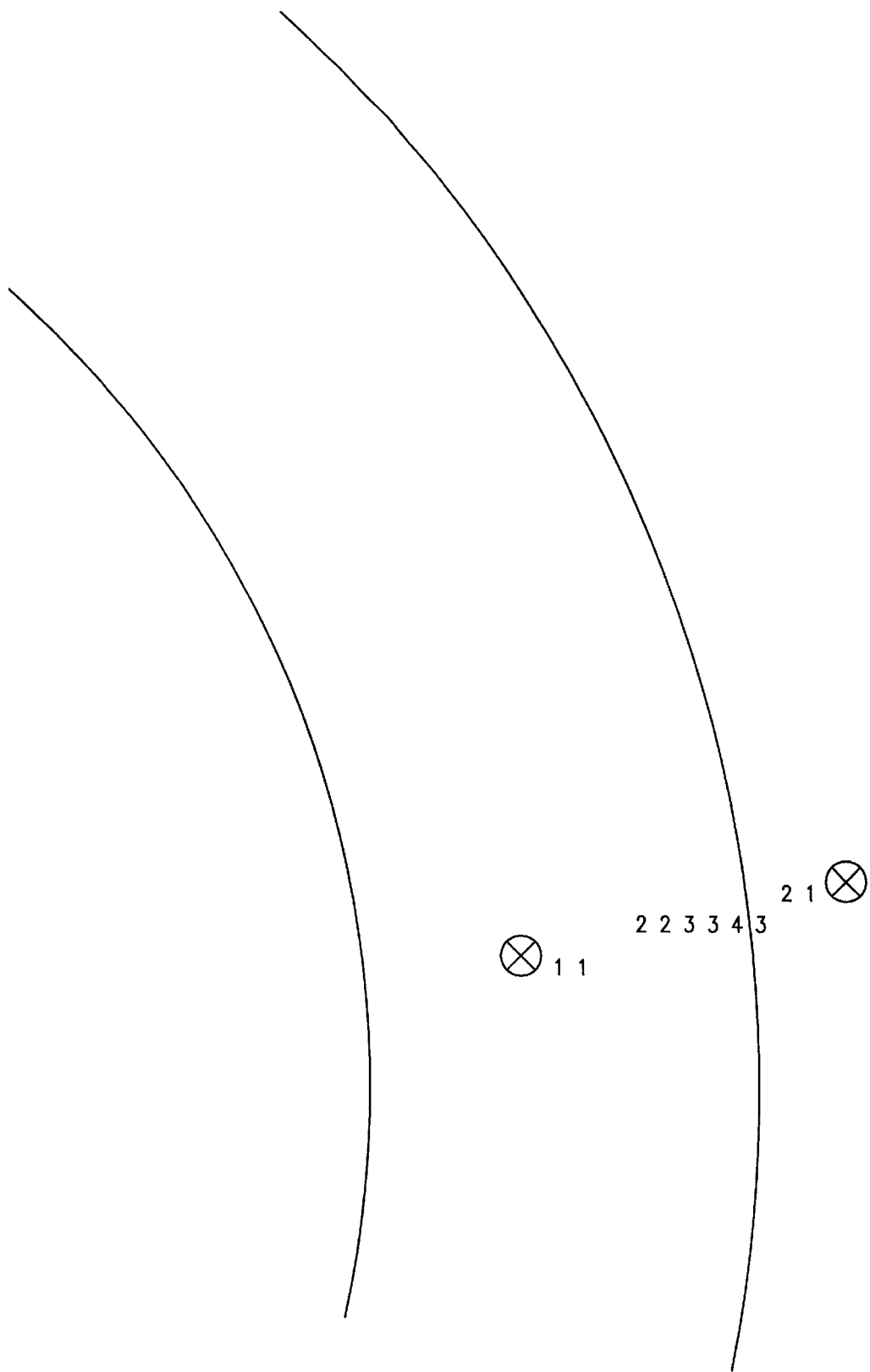
Figure 6F:
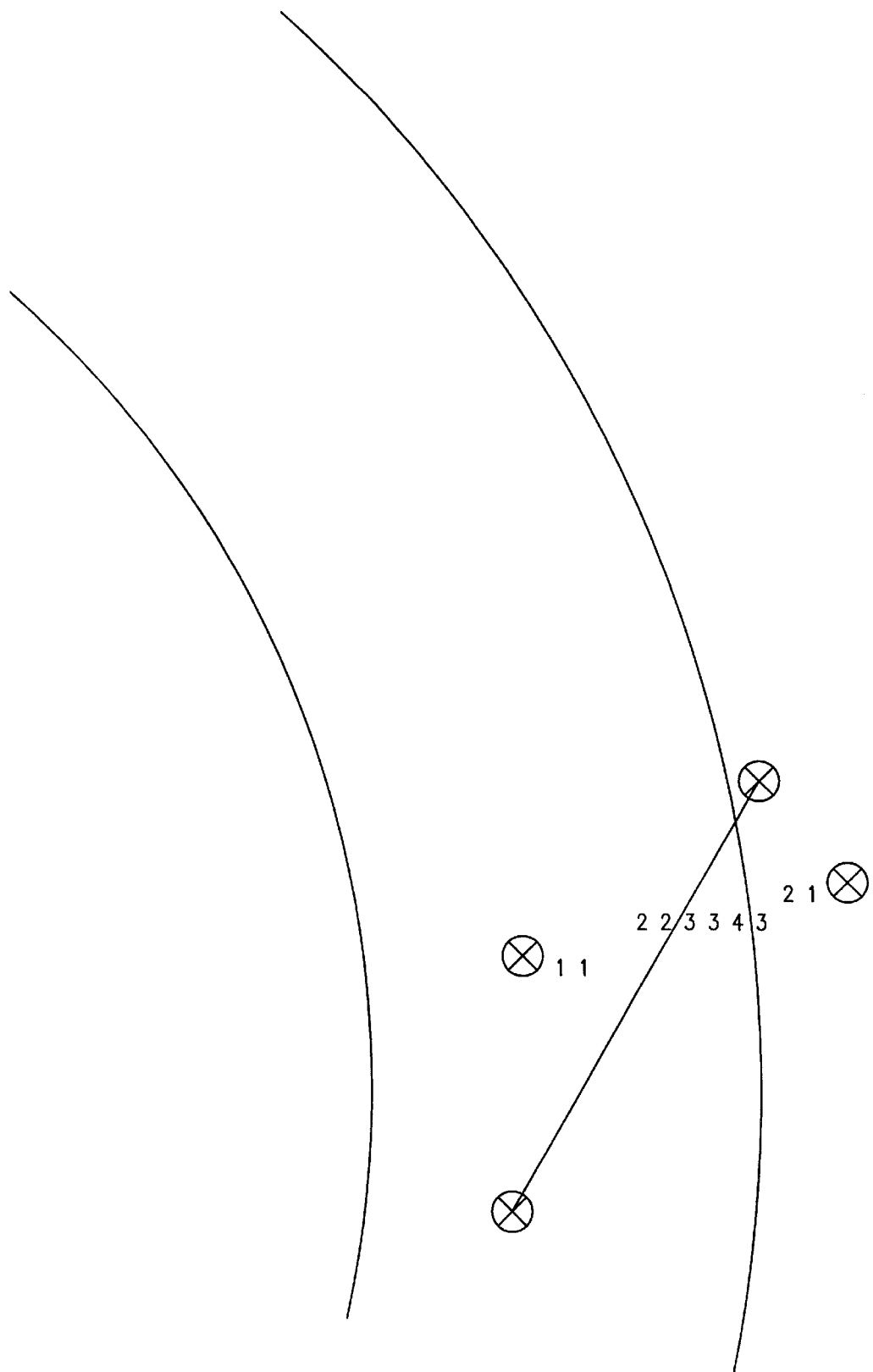
Figure 6G:
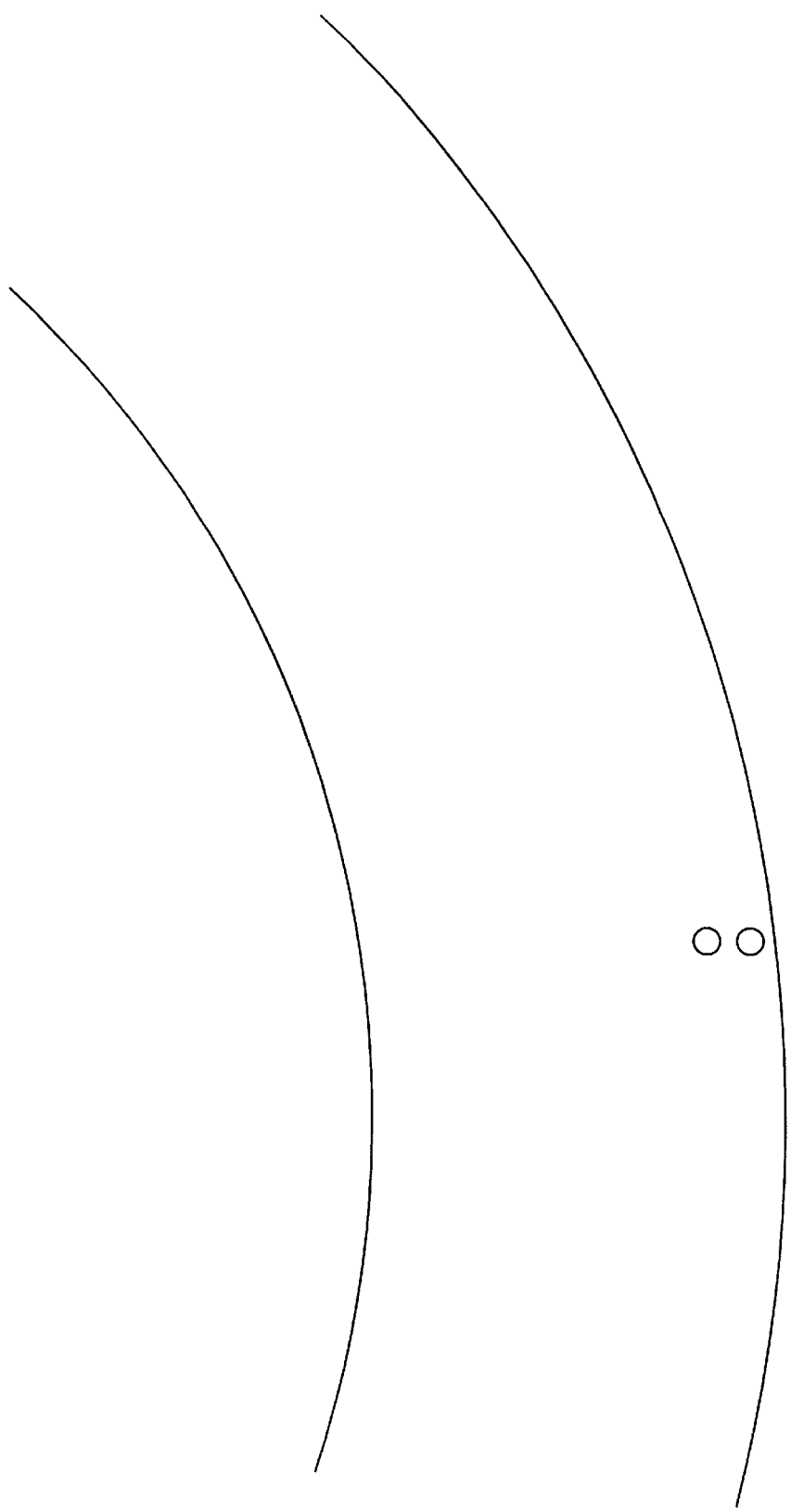

The exemplary data illustrated in FIG. 6A is obtained from the flash index 54 which itself is loaded from the flash buffer 63. The processing to create the data of FIGS. 6B and 6C is apparent and therefore is not further described. It should be emphasized that the illustrations of FIGS. 6A–C are useful to describe the process of the CPU 50 but the data itself need not be displayed at this point in the processing. At this point, the area of interest is divided into a grid. Each cell in the grid is called a neighborhood. See FIG. 6D. Each neighborhood contains a weight (probable number of strikes) and an enhancement flag. The most recent data (such as data acquired over the past three minutes) is used to define the weight of each neighborhood. For each of the recent flashes, the weight of the neighborhoods that lie on the line segment defined by the 50% and 30% points of the flash are updated by the weight of the flash taken with the probability distribution described above. This process creates a picture of the most recent storm activity at the various neighborhoods. FIG. 6E shows this process of filling in the neighborhood weights for one new flash. FIG. 6E shows the weight of each neighborhood between the endpoints of the "new" flash. In particular, for each neighborhood which coincides with a portion of the flash, the weight of the flash for that portion is copied as the weight of the neighborhood. As seen in FIG. 6E, the weights vary from unity (the minimum weight in this embodiment) to four, the maximum weight of this flash. The data could be used in this form, but the multiple position viewing enhancement has not been completed yet. To complete the enhancement, older data (such as the oldest three minutes of data) is combined with the recent data. Before the "old" data can be combined account must be taken of the difference in position of the aircraft or platform between the time the "old" data was acquired and the time that the more recent data was acquired. This is because the range and azimuth parameters are all relative to the aircraft position. For that reason the flash index includes the position of the aircraft at the time the data was acquired. Thus, before the "old" data is used that "old" data is updated or corrected (just as in the case of embodiment of FIGS. 1 and 4). In this case the range and azimuth data must be modified to account for the change in position of aircraft between the time the data was acquired and the present. That correction is easily effected since the position of the aircraft at the time the data was acquired is available from the anchor portion of the flash index and the present position of the aircraft is available from the GPS receiver 52. The mechanics of the correction are well known and need not be described here. The same 50% point and 30% beyond the furthest strike point are used for each old flash. FIG. 6F is identical to FIG. 6E except that an "old" flash data is also displayed as a line segment. For each neighborhood that lies between these two points for an old flash and which also has a weight higher than zero (some recent activity), the enhancement flag is set. As seen in FIG. 6F, the updated data for the "old" flash and "new" flash intersect in the neighborhoods with weight of 3. FIG. 6G shows the neighborhoods with their enhancement flags set. In other words, for a neighborhood that had storm activity within the past three minutes and also had activity about ten minutes ago, there is a higher likelihood that the neighborhood defines the correct location of the weather. Therefore the enhancement flag is set for that neighborhood.

Figure 8A:
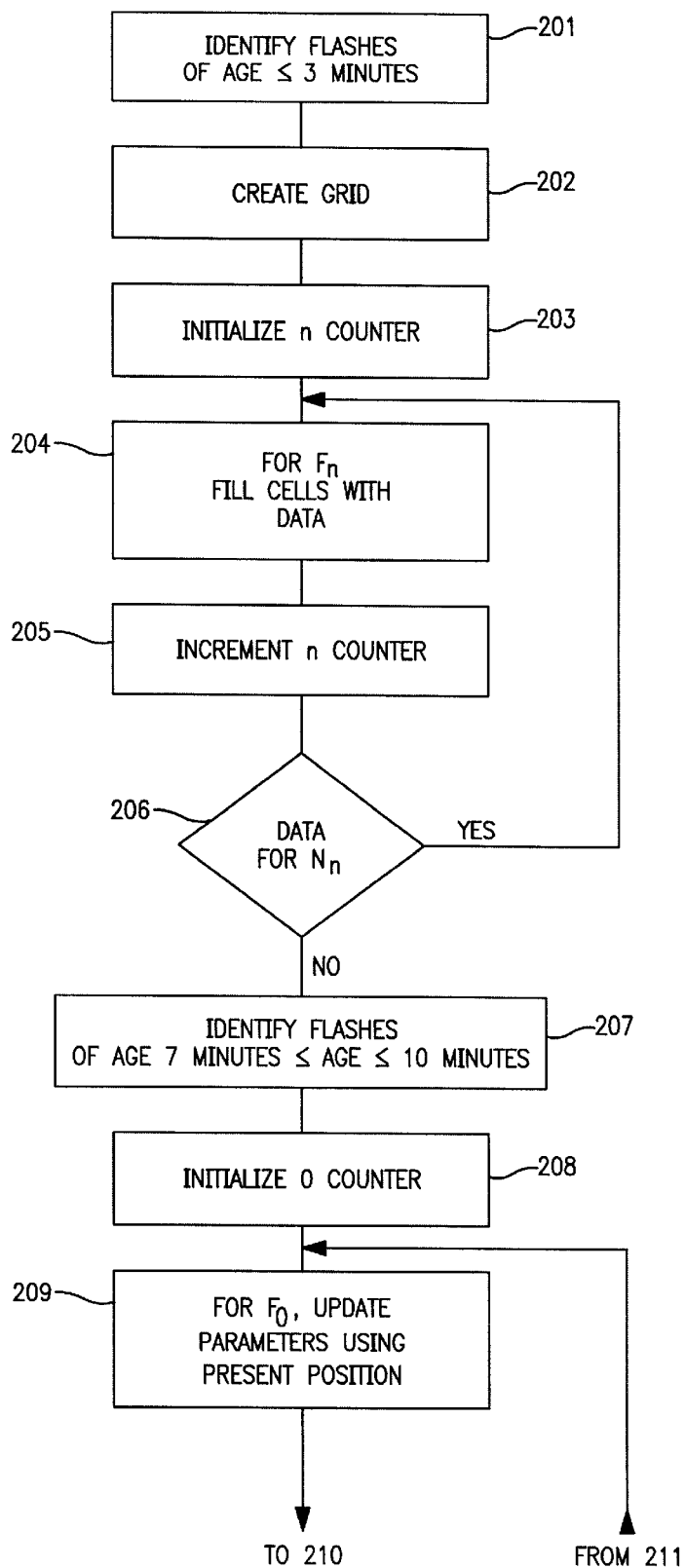
FIGS. 8A and 8B, together, represent a flow chart of the enhancement processing implemented by the processor 50.
Figure 8B:
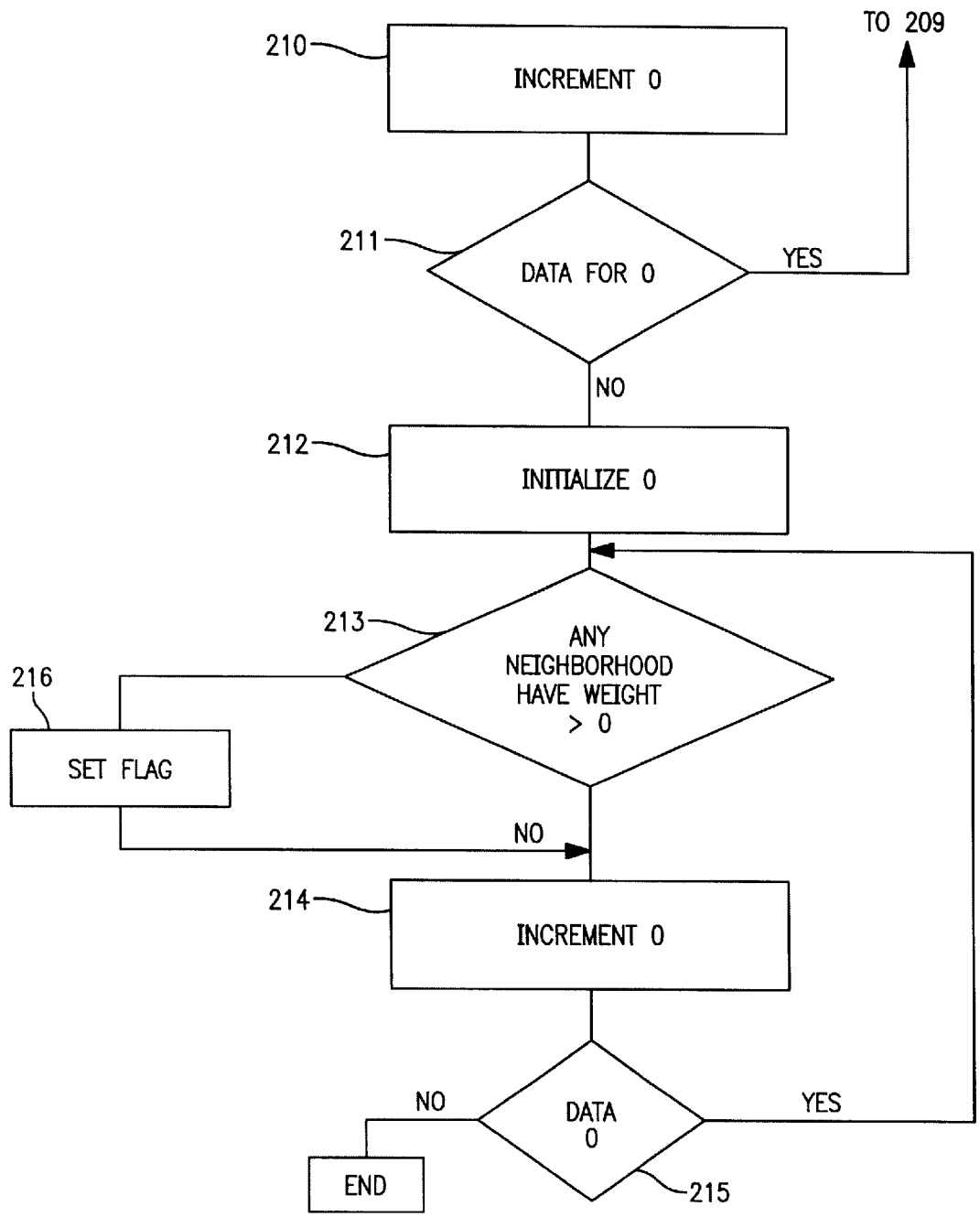

The foregoing processing is illustrated in FIGS. 8A and 8B. The initiation of this procedure is initiated at a rate that provides a reasonably current image to the user, preferably around once per second. Referring first to FIG. 8A, on initiation function 201 identifies (i.e. counts) the number of flashes in the flash index 54 having an age less than or equal to a first predetermined age. In the embodiment illustrated in FIG. 8A that is three minutes. Function 202 creates the grid of FIGS. 6D–6G, for the flashes identified in function 201. Function 203 initializes an n counter (which will count the number of flashes identified in function 201). Thereafter, function 204 adds to the weight of each neighborhood in the grid the distributed weight of the flash $F_n$. The data employed in function 204 is the location and activity weight of each flash $F_n$. Since the enhancement process is not yet completed, each enhancement flag will be in the off state. Having performed function 204 for a given flash, function 205 increments the n counter, then function 206 checks to see if there is any data for $F_n$. If there is, functions 204 and 205 are performed for each flash, until each of the flashes having been identified in function 201, is processed.

Thereafter, function 207 identifies flashes of a second predetermined age, i.e. from 7 to 10 minutes in age, for this embodiment. Function 208 initializes the o counter which will count the number of flashes identified in function 207. Function 209 updates the parameters of flash $F_o$. using the present position of the aircraft. In particular, each flash has bearing, maximum range and minimum range parameters. These are the parameters that were determined relative to the range and azimuth of the original strikes which make up the flash. These measurements were made when the strikes were initially detected. At that time, the aircraft occupied the position identified in the "anchor" entry in the flash index. In this embodiment those measurements are now 7 to 10 minutes old and the aircraft is in a different position. Function 209 updates the parameters of maximum range, minimum range and bearing with respect to the aircraft's present position. Each time the "old" data is used it may be updated, if the passage of time from the time the data was accurate is sufficient to require updating. There are several ways to accomplish this. First, the data as acquired may be maintained in memory until erased as too old, and the updates used and discarded as necessary. That is each update is only stored until the updated data is used, and then the updated data is discarded. Secondly, the originally acquired data may be discarded the first time it is used and replaced with the updated data. In this variant, it is also necessary to replace the originally applicable anchor position with the position of the platform at the time the data is updated. With this variant it is not always necessary to update the data on each use. If the time between the most recent update and a subsequent use is short enough it may not be necessary to update the data again. Whether or not updating is necessary may be determined based either on time or on a change in platform position. Of course, the present position is available from the GPS receiver 52 (or the LORAN receiver, if used).

Thereafter, function 210 (FIG. 8B) increments the counter o and function 211 determines if we have processed each of the old flashes. If not, processing loops back to process another "old" flash in function 209. Assuming that each of the old flashes has had their data updated, then function 212 again initializes the o counter. Functions 213–215 are a loop to check the data for each updated "old" flash to see if it coincides any neighborhood of non-zero weight from a "new" flash. If there is a correlation, i.e., a neighborhood with activity from both old and new flashes, then the enhancement flag for that neighborhood will be set in function 216. Function 216 sets the enhanced flag for each neighborhood that lies on the line defined by the 50% and 30% points of flash $F_o$ where the weight of the neighborhood is non-zero. At this point in processing, each neighborhood in the grid that has had recent activity will have a non-zero weight and each of those neighborhoods that also had activity some time ago, i.e. 7 to 10 minutes ago, will have the enhancement flag set. Function 215 determines if we have processed each of the updated "old" flashes. Assuming we have not, processing loops back to again perform function 213.

Having proceeded through this processing, those enhancement flags which are in the set state identify overlaps or correlation between the location of a "new" flash with the updated location of an "old" flash. It is these locations which the enhancement has identified. It is then simple to merely display the enhanced locations as the most probable location of weather activity, see FIG. 6G. While the invention is directly concerned with creating and displaying the enhanced weather data as just described, there may or may not be other data displayed as well. In other words, in some embodiments only enhanced data is displayed while in other cases both normal and enhanced data may both be displayed. It will be important to distinguish these two types of data on the display, such as by color or the like.

Those skilled in the art will understand that the selection of the data which is compared can be varied without departing from the spirit or scope of the invention. In other words, it is not essential that three minutes worth of data is selected; the data period can be varied to optimize the enhancement. Likewise, the fact that 10 minutes of data is saved or that the "newest" three minutes worth of data is compared with the "oldest" three minutes worth of data in this 10 minute period, can all be varied without departing from the invention.

The size of the neighborhoods is not extremely important, and may change depending upon the display resolution and the maximum range being displayed. What is important is that if there was weather activity within that neighborhood over an extended period, it is likely that there is truly weather activity within that neighborhood.

Once the enhancement pass has been performed, all that remains is to place the enhanced image on the display. Since this process is straight-forward for one well versed in the art, elaboration will not be made.

As described we prefer to maintain flash data for about no more than 10 minutes and use, for comparison purposes, the most recent three minutes of flash data with the oldest three minutes of data. Since we have limited the data to no more than 10 minutes in time, the oldest three minutes of data is data which is seven to ten minutes in age. Those skilled in the art will understand that these parameters are based on various tradeoffs so that they can be varied within the spirit and scope of the invention. In particular, the data is limited for two reasons, one reason is cost and the other is that older data may be so old as to no longer have relevance to the current weather situation. Whereas the first reason is constant, the second is partially dependent on the speed of the aircraft relative to the weather. In general, we prefer to use a first predetermined portion (for example the most recent three minutes) of data in the flash index and compare or combine that with data from a second predetermined portion of the flash index (for example the oldest three minutes). While the first and second predetermined portions of the data are different they may overlap in time, and it is not necessary for these portions to be of equal duration, i.e., the first portion may be longer or shorter than the second.

What is claimed is:

1. A system for enhancing an estimate of the location of a lightning related weather pattern relative to a moving platform comprising:
   a) a receiver, supported on the platform, responsive to electrical signals generated by the lightning in a predetermined frequency bad,
   b) a processor responsive to an output of the receiver for
      b1) at one times determining the relative azimuth of a source of the electrical signals, for
      b2) at a later time, determining the relative azimuth of a source of the electrical signals, for also
      b3) updating a relative azimuth indication obtained at the one time to offset the motion of the platform between the one and the later time to produce an updated azimuth indication, and for,
      b4) combining both the relative azimuth indication obtained at the later time and the updated azimuth indication to estimate the location of the weather pattern.

2. A system as recited in claim 1 further including a memory coupled to the processor for storing data including azimuth indications.

3. A system as recited in claim 2 wherein
   the processor associates a time parameter with azimuth indications, and wherein
   the memory stores the time parameter along with the azimuth indication.

4. A system as recited in claim 3 where the processor deletes azimuth indications older than a predetermined threshold.

5. The system of claim 1 in which the processor determines a range estimate along with the azimuth indication.

6. The system of claim 1 wherein the processor combines azimuth indications taken exclusively from a first group of azimuth indications with an azimuth indication taken from a second, different group of azimuth indications.

7. The system of claim 5 wherein the processor combines azimuth indications taken exclusively from a first group of azimuth indications with an indication taken from a second, different group of azimuth indications.

8. The system of claim 7 wherein the processor updates range estimates and combines both range and azimuth to locate the weather pattern.

9. A system for estimating the location of a lightning related weather pattern relative to a moving platform, comprising:
   a receiver, supported on the platform, responsive to electrical signals generated by the lightning in a predetermined frequency band,
   a strike detector connected to the receiver for computing and storing strike detector data including azimuth indications,
   a flash assembler connected to the strike detector to create flash data including azimuth and weight parameters from one or more strikes,
   processing means responsive to the flash data, and including a memory, for storing flash data and for enhancing flash data by combining flash data for flashes occurring at different times, and
   a display responsive to the processing means to display enhanced flash data.

10. The system of claim 9 wherein the strike detector data includes range and time parameters, and wherein the flash data includes range and time parameters.

11. The system of claim 9 or claim 10 wherein the data appearing on the display includes enhanced and non-enhanced flash data.

12. The system of claim 9 or claim 10 in which the processing means purges the memory of flash data related to flashes older than a predetermined age.

13. The system of claim 9 or claim 10 wherein the processing means combines flash data exclusively from a first group of recent flash data with a second group of least recent flash data.

14. A method of enhancing an estimate of the location of a lightning related weather pattern relative to a moving platform, comprising:
    receiving, on the platform, electrical signals generated by lightning in a predetermined frequency band,
    determining from the received signals the azimuth of a source of the electrical signals relative to the platform,
    storing at least one memory indication of the azimuth from at least one said determination,
    updating one or more stored memory indications to offset for the motion of the platform to provide at least one updated azimuth indication, and
    combining at least one stored and at least one updated indication for enhancing an estimate of the location of the weather pattern as the intersection of a memory indication and an updated indication.

15. A method for estimating the location of a lightning related weather pattern relative to a moving platform, comprising:
    receiving electrical signals generated by the lightning in a predetermined frequency band,
    determining, from the received signals, strike data corresponding to the azimuth and range of a source of the electrical signals relative to the platform,
    creating flash data including azimuth, range and time parameters from the strike data with respect to strikes which are adjacent to each other in time and azimuth,
    enhancing an estimate of the weather pattern location by combining flash data for flashes occurring at different times but at corresponding locations, and displaying the enhanced data.

16. The method of claim 15 wherein the flash data which is combined includes a first set of most recent flash data and a second set of different flash data.

17. The method of claim 16 wherein flash data is modified before being combined to offset for motion of the platform between the time of the second set of different flash data and the most recent data.

18. The method of claim 16 wherein the flash data which is combined is exclusively a first set of most recent flash data and a second set of least recent flash data.

19. A method of locating a lightning related weather patter relative to a moving platform by measuring azimuth of the pattern, from the moving platform only, at substantially separated instants in time.

20. The method of claim 19 wherein the method of locating includes detecting the azimuth of the lightning related weather pattern by radio frequency emission at the two substantially separated instants in time.

21. The method of claim 19 wherein the method includes measuring a first azimuth as the direction from the moving platform to the weather pattern at a first instant in time and measuring a second azimuth as the direction from the moving platform to the weather pattern at a second instant in time, substantially later than the first instant.

22. The method of claim 21 which includes the first step of updating the first azimuth to account for movement of the platform between the first and second instant in time.

23. The method of claim 22 which further includes combining the updated first azimuth and the second azimuth to locate the weather pattern.

24. A method of locating a lightning related weather pattern relative to a moving platform by measuring the relative azimuth of the pattern only from two separate locations of the platform.

25. The method of claim 24 wherein the method of locating includes detecting the azimuth of the lightning related weather pattern by radio frequency emission received at two substantially separated locations of the platform.

26. The method of claim 24 wherein the method includes measuring a first azimuth as a direction from the weather pattern to the moving platform at a first location and measuring a second azimuth as a direction from the weather pattern to the moving platform at a second location, substantially displaced from the first location.

27. The method of claim 26 which includes the further step of updating the first azimuth to account for movement of the platform between the first and second locations.

28. The method of claim 27 which further includes combining the updated first azimuth and the second azimuth to locate the weather pattern.

* * * * *